(12) United States Patent
Haddad

(10) Patent No.: US 10,048,941 B2
(45) Date of Patent: Aug. 14, 2018

(54) RANDOM NUMBER GENERATOR

(71) Applicant: Waleed Sami Haddad, San Francisco, CA (US)

(72) Inventor: Waleed Sami Haddad, San Francisco, CA (US)

(*) Notice: Subject to any disclaimer, the term of this patent is extended or adjusted under 35 U.S.C. 154(b) by 0 days.

(21) Appl. No.: 15/496,781

(22) Filed: Apr. 25, 2017

(65) Prior Publication Data

US 2017/0308358 A1 Oct. 26, 2017

Related U.S. Application Data

(60) Provisional application No. 62/327,243, filed on Apr. 25, 2016.

(51) Int. Cl.
*G06F 7/58* (2006.01)
*G01J 1/44* (2006.01)

(52) U.S. Cl.
CPC .............. *G06F 7/588* (2013.01); *G01J 1/44* (2013.01)

(58) Field of Classification Search
CPC .................................. G06F 7/588; G01J 1/44
USPC ........................................................ 708/255
See application file for complete search history.

(56) References Cited

U.S. PATENT DOCUMENTS

| | | | |
|---|---|---|---|
| 4,665,502 A | 5/1987 | Kriesner | |
| 5,344,199 A | 9/1994 | Carstens et al. | |
| 8,125,620 B2* | 2/2012 | Lewis | G01S 7/4811 356/5.01 |
| 8,348,749 B1 | 1/2013 | Ungaro et al. | |
| 8,476,846 B1 | 7/2013 | Ess et al. | |
| 9,468,069 B2 | 10/2016 | Lee | |
| 2004/0189100 A1* | 9/2004 | Gasperi | G01D 5/24 307/125 |
| 2005/0245307 A1 | 11/2005 | Gatto et al. | |
| 2008/0181649 A1 | 8/2008 | Readler et al. | |
| 2016/0114221 A1 | 4/2016 | Binder | |

* cited by examiner

*Primary Examiner* — Tan V. Mai
(74) *Attorney, Agent, or Firm* — Hollingsworth Davis, LLC

(57) ABSTRACT

An apparatus comprises a light emitting diode (LED) and a phototransistor configured to receive light from the LED and generate an electrical signal comprising shot noise. An amplifier is coupled to the phototransistor and configured to amplify the electrical signal. Sampling circuitry is coupled to the amplifier. For a plurality of temporally spaced sample pairs each defined by two consecutive time points in the amplified signal, the sampling circuitry is configured to determine a difference in amplitude of the amplified signal at each of the two consecutive time points and output a differential sample value indicative of the amplitude difference. The differential sample values for the plurality of sample pairs define a plurality of random numbers.

20 Claims, 5 Drawing Sheets

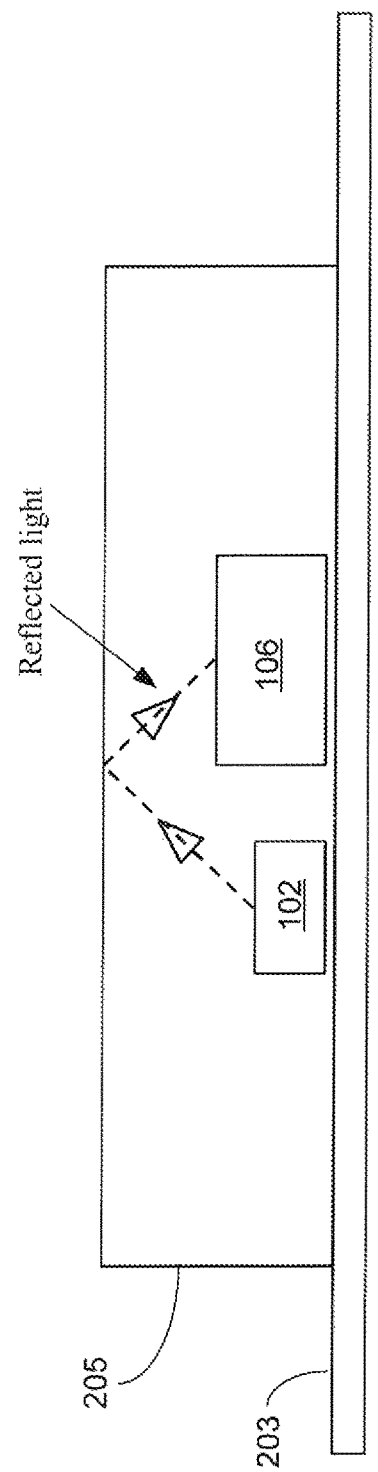

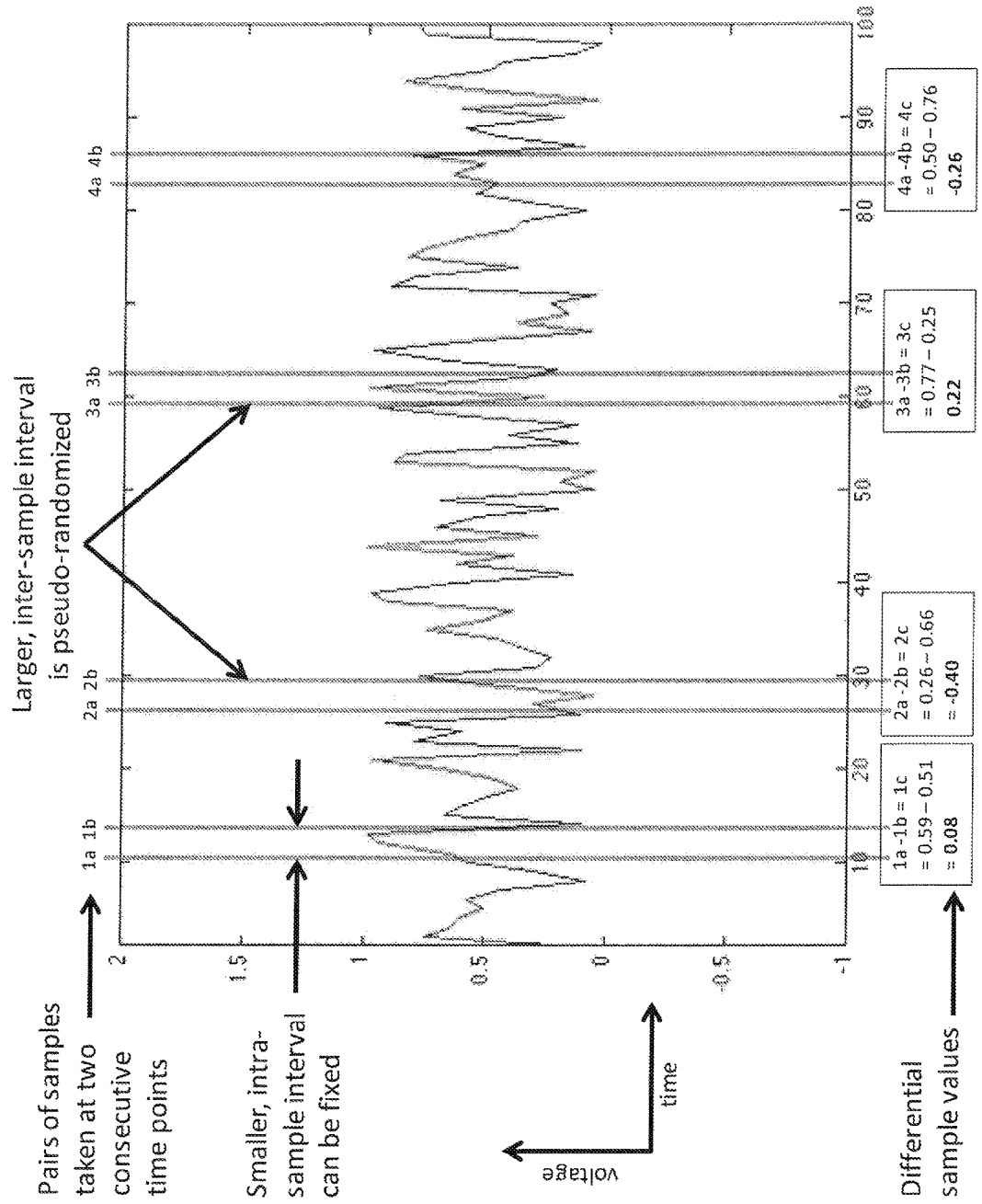

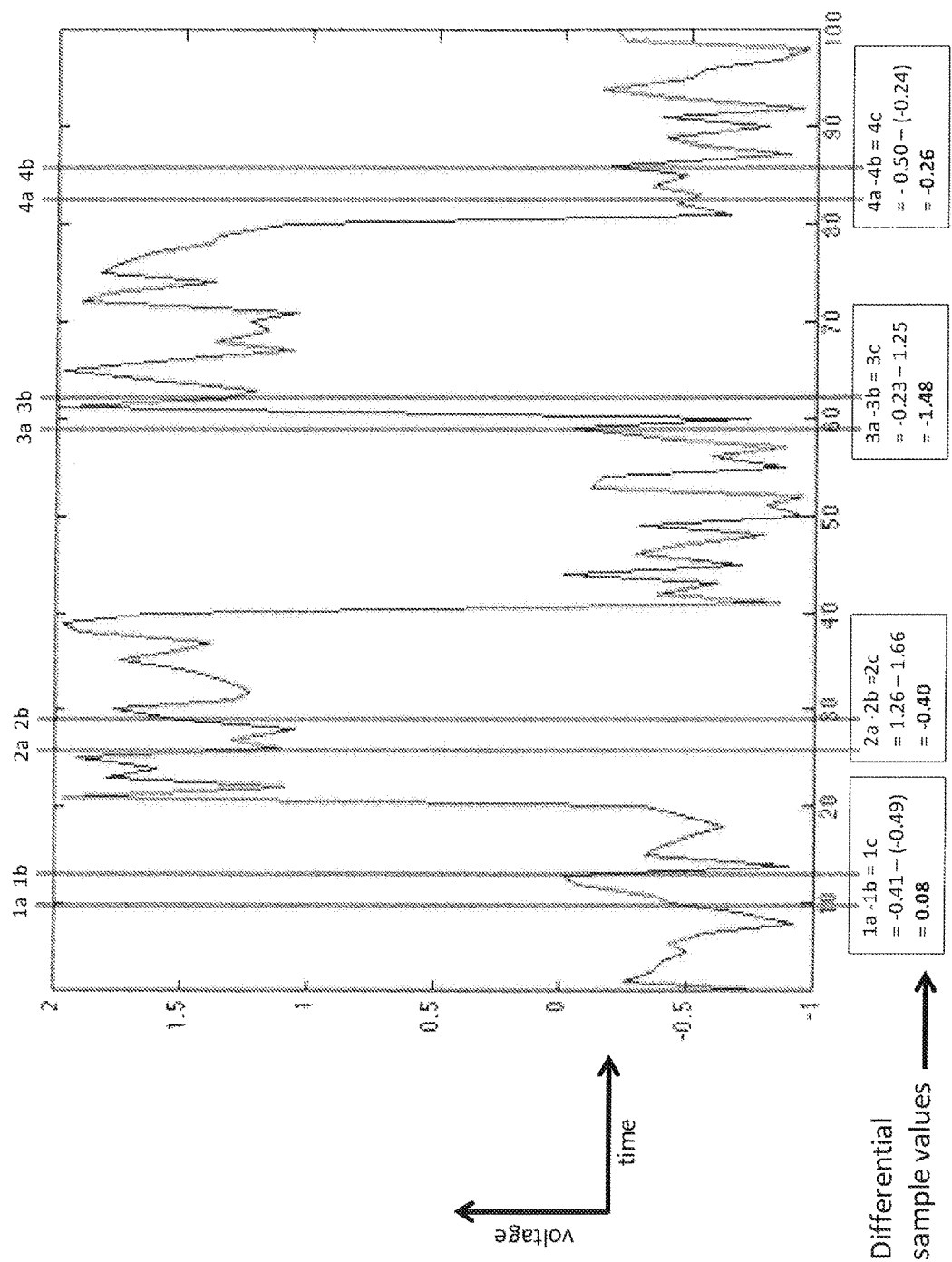

RANDOM NUMBER GENERATOR

RELATED PATENT DOCUMENTS

This application claims the benefit of Provisional Patent Application Ser. No. 62/327,243, filed on Apr. 25, 2016, to which priority is claimed pursuant to 35 U.S.C. § 119(e) and which is hereby incorporated herein by reference.

SUMMARY

Embodiments of the disclosure are directed to a method comprising generating a signal comprising random noise. For a plurality of temporally spaced sample pairs each defined by two consecutive time points in the signal, the method comprises determining a difference in amplitude of the signal at each of the two consecutive time points, and outputting a differential sample value indicative of the amplitude difference. The differential sample values for the plurality of sample pairs define a plurality of random numbers.

Other embodiments are directed to an apparatus comprising a light emitting diode (LED) and a photosensor configured to receive light from the LED and generate an electrical signal comprising shot noise. An amplifier is coupled to the photosensor, such as a phototransistor, and configured to amplify the electrical signal. Sampling circuitry is coupled to the amplifier. For a plurality of temporally spaced sample pairs each defined by two consecutive time points in the amplified signal, the sampling circuitry is configured to determine a difference in amplitude of the amplified signal at each of the two consecutive time points and output a differential sample value indicative of the amplitude difference. The differential sample values for the plurality of sample pairs define a plurality of random numbers.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 3 shows a subset of components of a random number generator circuit covered by a Faraday cage in accordance with various embodiments;

FIG. 4 shows random voltage from a random number generator circuit without contamination by an external signal and sampling of same in accordance with various embodiments; and FIG. 5 shows random voltage from a random number generator circuit with contamination by an external square wave signal and sampling of same in accordance with various embodiments.

The figures are not necessarily to scale. Like numbers used in the figures refer to like components. However, it will be understood that the use of a number to refer to a component in a given figure is not intended to limit the component in another figure labeled with the same number.

DESCRIPTION

A random number generator (RNG) includes both a simple circuit with a light emitting diode (LED) and a phototransistor, and a sampling scheme used when digitizing the analog voltage output of the circuit. The sampling scheme uses a combination of differential sampling, and non-periodic sampling to mitigate contamination. This approach maintains the randomness of the signal in the presence of strong external signals.

The LED is used to produce a low-level light output which, when received by the phototransistor, contains shot noise, which is quantum mechanical noise (e.g., Johnson noise), and is therefore thought to be truly random. This signal can be amplified in a purposely noisy way to increase the noise (variation) in the signal even more, and produce an analog voltage output that has sufficient amplitude to be satisfactory for digital sampling.

A Faraday cage can be placed over the circuit for RF and optical shielding. The Faraday cage can also serve to reflect light from the LED to the phototransistor if surface mount components are used. If the Faraday cage is not needed, or does not provide sufficient isolation from external light, and good optical coupling between the LED and phototransistor, a separate optical shield can also be applied over just the LED and phototransistor to provide optical shielding and as a reflector. It is noted that the Faraday cage can be extended to cover all susceptible parts of the random number generator circuit to prevent contamination from EMI/RFI. This protection against EMI/RFI can be important in minimizing biasing of the output from the RNG due to both ambient EMI/RFI noise, as well as malicious biasing caused by intentional transmission of a strong signal intended to disrupt the RNG in order to hack a device that is using the RNG.

The circuit and sampling scheme work together to create a true random signal which is robust against external contamination from both RF and optical noise. The use of the specialized sampling scheme allows the circuit to be kept simple, small and inexpensive, by mitigating contamination by external signals.

Figure 1:
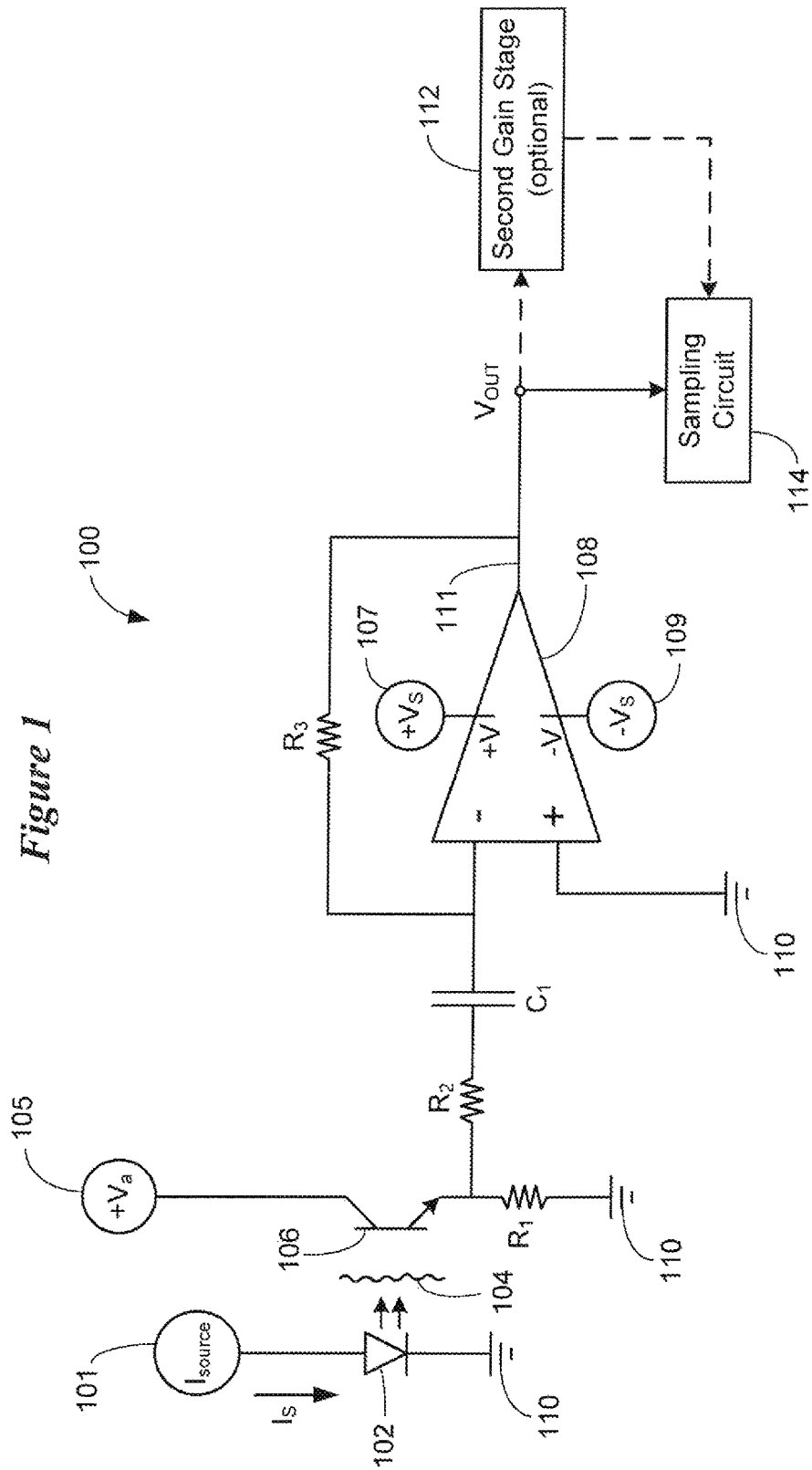
FIG. 1 is a circuit diagram of a random number generator in accordance with various embodiments.

FIG. 1 illustrates a random number generator 100 in accordance with various embodiments. The RNG 100 includes an LED 102 coupled between a current source 101 and ground 110. The current source 101 provides a current, $I_S$, which is the drive current for the LED 102. The LED 102 is optically coupled to a phototransistor 106. The LED 102 produces a low-level light output which is received by the phototransistor 106.

The level of light generated by the LED 102 should be optimized for a combination of randomness (entropy), and the rate at which random samples can be generated. The random numbers are based on optical shot noise which has approximately a Gaussian distribution. That means that the width of the distribution is approximately sqrt(N), where N is the average number of photons received per second. So, as the LED light level goes low, the statistical width of the photon count in a given fixed time window increases relative to N, which is desirable, but then the count rate goes down, which results in a low rate of random number production. The converse is true as well. Ideally, the LED light level, and the circuit 100 should be tuned together to produce the desired properties.

In some embodiments, an optical attenuator 104 can be situated between the LED 102 and the phototransistor 106. The optical attenuator 104 is configured to control the amount of light (number of photons per second) received by the phototransistor 106. This may be needed to achieve a desired (e.g., optimal) counting statistics curve that is roughly very flat before exceeding the threshold current of the LED 102, followed by a sharp upward turn at the threshold current level, and then rising linearly and rapidly beyond the threshold current. Accordingly, there needs to be enough current driving the LED 102 to get it to produce light reliably, but this may be too much light for good statistics in the RNG design, especially if the LED 102 and phototransistor 106 are in close proximity to each other. The optical attenuator 104 can be used in conjunction with adjusting the LED drive current to optimize the photon flux to the phototransistor 106. The optical attenuator 104 can be an absorber, scatterer, diffuser or reflection suppressor, for example.

Preferably, the drive current, $I_S$, is set to maximize shot noise. The drive current, $I_S$, will depend on the type of LED 102 used, the attenuator 104, and the sensitivity of the phototransistor 106. One approach to setting the LED drive current, $I_S$, (in conjunction with the attenuator, if necessary) for a particular amplifier circuit design is to do it empirically, preferably while monitoring the analog voltage output from the circuit 100 with an oscilloscope. Once this is set, the design of the RNG 100 can in principle be copied without testing each production unit. If the LED light output is too bright, the randomness (noisiness) in the analog voltage will start to go down as the LED current is increased, and will eventually saturate the circuit, and go flat at the amplifier voltage rail. If the LED current is too low, the noisiness in the analog voltage can also be seen to go down, eventually going nearly flat again as the light signal goes to zero. An optimal current setting can be found when the noisiness (variation) in the analog voltage output of the circuit 100 is maximized.

The phototransistor 106 is coupled between a voltage source 105 and ground 110. In some embodiments, the voltage source 105 is a +5 V source. A collector of the phototransistor 106 is coupled to the voltage source 105. A resistor, $R_1$, is coupled between an emitter of the phototransistor 106 and ground 110. The emitter of the phototransistor 106 is also coupled to the inverting input (−) of an Op Amp 108. A resistor, $R_2$, and a capacitor, $C_1$, are connected in series between the emitter of the phototransistor 106 and the inverting input of the Op Amp 108. A non-inverting input (+) of the Op Amp 108 is coupled to ground 110. A feedback resistor, $R_3$, is coupled between the inverting input and an output 111 of the Op Amp 108. A +V input of the Op Amp 108 is coupled to a positive voltage supply 107, and a −V input of the Op Amp 108 is coupled to a negative voltage supply 109. In some embodiments, the positive voltage supply 107 is a +5 V source and the negative voltage supply 109 is a −5 V source.

In some embodiments, a sampling circuit 114 is coupled to the output 111 of the Op Amp 108. In other embodiments, the output 111 of the Op Amp 108 is coupled to an optional second gain stage 112 (e.g., a second Op Amp stage), and the sampling circuit 114 is coupled to an output of the second gain stage 112. It is noted that the initial gain stage (Op Amp 108) is intentionally made extremely high, with a very large feedback resistor, $R_3$. This is done to increase the random noise in the circuit by adding quantum noise (e.g., Johnson noise) in the resistor $R_3$ and phototransistor 106 to the shot noise from the LED signal.

According to various embodiments, the circuit shown in FIG. 1 can have the following components and component values. The resistor $R_1$ can have a value of 300Ω, resistor R2 can have a value of 16Ω, and the feedback resistor $R_3$ can have a value of 10 MΩ. The capacitor C1 can have a value of 220 pF. The phototransistor 106 can be an OP802WSL phototransistor available from OPTEK Technology. The Op Amp 108 can be an LM741CN-6 Op Amp available from National Semiconductor or Fairchild Semiconductor. It is understood that the specific components and values shown in the representative circuit of FIG. 1 are provided for non-limiting illustrative purposes and can vary depending on the circuit design.

Figure 2:
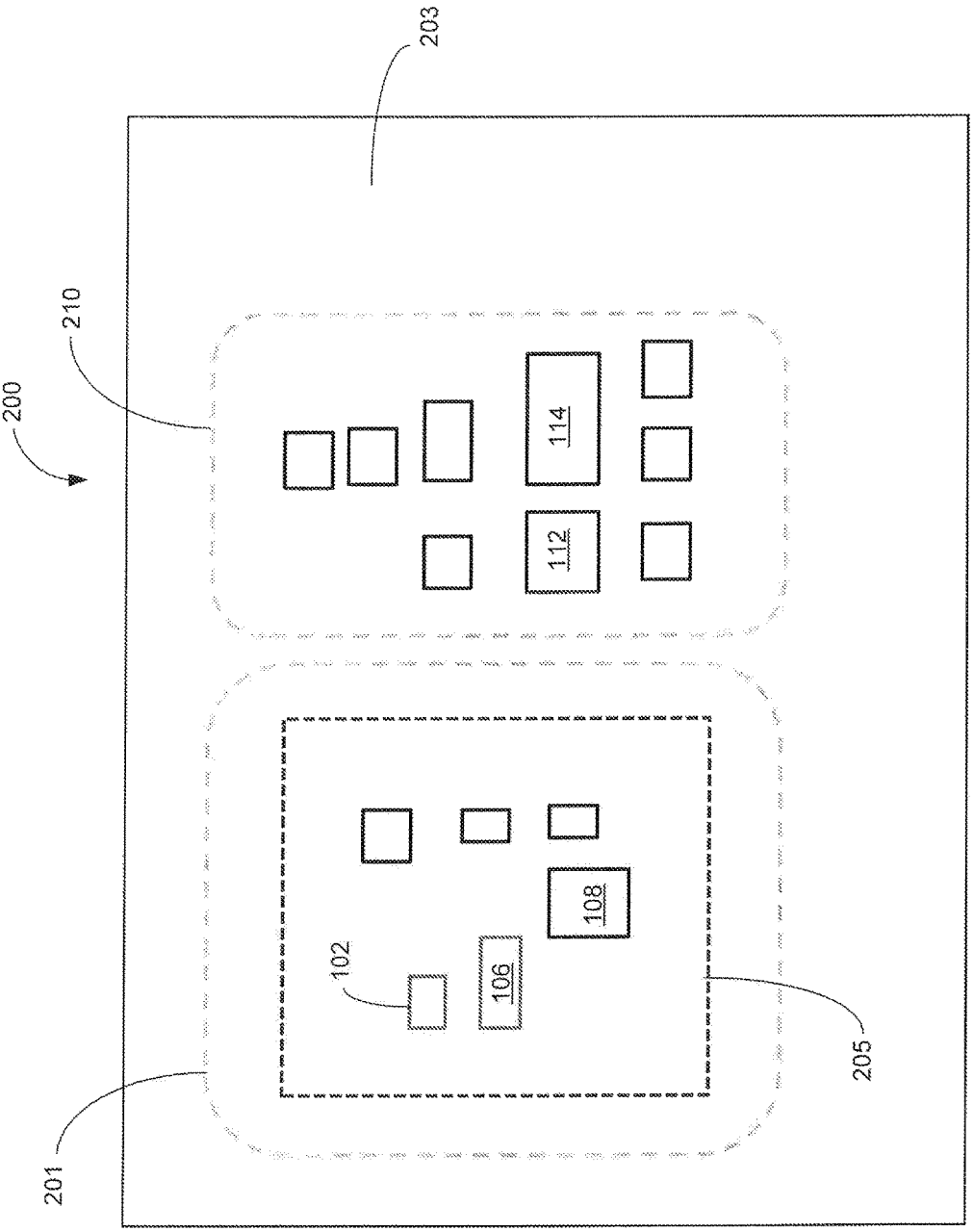
FIG. 2 shows components of a random number generator circuit affixed to a printed circuit board in accordance with various embodiments.

FIG. 2 is a block diagram of the RNG circuit 100 shown in FIG. 1 in accordance with various embodiments. Region 201 of a printed circuit board (PCB) 203 includes the various RNG circuit components including the LED 102, phototransistor 106, and Op Amp 108. Various components of the RNG circuit 100 can be placed under a Faraday cage 205 for RF and optical shielding. As can be seen in FIG. 3, at least the LED 102 and phototransistor 106 can be placed under the Faraday cage 205. The Faraday cage 205 can serve to reflect light from the LED 102 to the phototransistor 106 if surface mount components are used. Region 210 of the PCB 203 includes various components such as the sampling circuit 114, which incorporates or is coupled to an analog-to-digital converter. In some embodiments, a second gain stage 112 (e.g., a second Op Amp stage) can be coupled between the output of the Op Amp 108 and the input of the sampling circuit 114.

In some embodiments, an optical attenuator can be added to the top of the Faraday cage 205, if needed. In this implementation, the optical attenuator has the same purpose and function as the optical attenuator 104 discussed previously, but operates in a reflection mode. It is noted that an optical attenuator of the circuit 100 can be designed to be used in a transmission mode, or a reflection mode, absorbing or deflecting light as it passes though, or reflecting light from the attenuator, respectively. Since the roof of the Faraday cage 205 is used as a reflector in the embodiment shown in FIG. 3, the attenuator can, for example, be formed from a material such as a piece of felt that partially absorbs, and partially scatters, the light, thereby reducing the reflectivity of the roof of the Faraday cage 205, and hence amount of LED light collected by the phototransistor 106

FIGS. 4 and 5 show details of the sampling scheme by which a signal ($V_{out}$) produced by the analog front end of the random number generator 100 is sampled by the sampling circuit 114 to generate differential sample values constituting truly random numbers. FIG. 4 shows random voltage from the RNG circuit 100 without contamination by an external signal. FIG. 5 shows random voltage from the RNG circuit 100 with contamination by an external square wave signal, which simulates shot noise in the voltage signal.

The differential values 1c (1a−1b), 2c (2a−2b), 3c (3a−3b) and 4c (4a−4b) shown in FIGS. 4 and 5 can be used directly as random numbers, or can be binarized in order to obtain 1 and 0 values. If, due to signal contamination as shown in FIG. 5 (differential value 3c), certain values are offset, processing can be applied to rescale the values to force them to stay within a specific range. For example, a modulo operation can be used. Binarization will also solve this problem. Other processing approaches can be used as well.

The non-periodic sampling illustrated in FIGS. 4 and 5 is essentially a random or pseudo-random time gap (inter-sample interval) between the pairs of samples that are taken. This spacing has simply to be non-periodic over a time frame that is long enough to be non-repeating during the collection for the data needed to produce at least a single random number. The sampling does not have to be truly random; it can be based on a standard pseudo-random number generator, or even a lookup table of pseudo random numbers. The random values will come from the noisy signal, and the overall sampling scheme.

It is noted that the intra-sample interval (time gap between two consecutive time points defining a sample pair) can be fixed or pseudo-randomized. Also, both the inter- and intra-sample intervals can be selected to optimize the performance of the random number generator with variations in the specific circuit design details, or operating conditions, such as presence of external noise.

In general terms, the sampling circuit 114 receives a signal comprising random noise from the analog front end of the random number generator 100. For a multiplicity of temporally spaced sample pairs each defined by two consecutive time points in the signal, the sampling circuit 114 is configured to determine a difference in amplitude of the signal at each of the two consecutive time points, and output a differential sample value indicative of the amplitude difference. The differential sample values for the multiplicity of sample pairs define a multiplicity of random numbers.

The random number generator embodiments disclosed herein are intended to be a good balance between low cost and size, and acceptable performance in creating enough entropy for use in devices requiring random numbers.

Some embodiments can be implemented to use a "whitening" function as a post-processing step to be applied to the digitized random numbers (by the sampling circuit 114) produced by the analog front end of the RNG circuit 100. A whitening function requires as input a set of random, or semi-random values with sufficient entropy. The whitening function can then create a better distribution of random numbers from this input. This is primarily a way of coping with bias in a random signal. There are existing, well-developed mathematical methods for "software whitening" that can be applied.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   generating a signal comprising random noise using an optical source;
   for a plurality of temporally spaced sample pairs each defined by two consecutive time points in the signal:
   determining a difference in amplitude of the signal at each of the two consecutive time points; and
   outputting a differential sample value indicative of the amplitude difference;
   wherein the differential sample values for the plurality of sample pairs define a plurality of random numbers.

2. The method of claim 1, wherein the signal comprises shot noise or quantum mechanical noise.

3. The method of claim 1, wherein signal is generated using a light emitting diode.

4. The method of claim 1, comprising attenuating light generated by the optical source to increase shot noise in the signal.

5. The method of claim 1, further comprising amplifying the signal to increase the random noise in the signal.

6. The method of claim 1, wherein:
   an intra-sample interval is defined between the two consecutive time points of each sample pair; and
   the intra-sample intervals for the plurality of sample pairs are fixed intervals.

7. The method of claim 1, wherein:
   an intra-sample interval is defined between the two consecutive time points of each sample pair; and
   the intra-sample intervals for the plurality of sample pairs are variable intervals.

8. The method of claim 1, wherein:
   an inter-sample interval is defined between adjacent sample pairs; and
   the inter-sample intervals for the plurality of sample pairs are variable intervals.

9. The method of claim 1, wherein:
   an inter-sample interval is defined between adjacent sample pairs; and
   the inter-sample intervals for the plurality of sample pairs are pseudo-randomized intervals.

10. An apparatus, comprising:
    a light emitting diode (LED);
    a photosensor configured to receive light from the LED and generate an electrical signal comprising shot noise;
    an amplifier coupled to the photosensor and configured to amplify the electrical signal; and
    sampling circuitry coupled to the amplifier and configured to:
    for a plurality of temporally spaced sample pairs each defined by two consecutive time points in the amplified signal:
    determine a difference in amplitude of the amplified signal at each of the two consecutive time points; and
    output a differential sample value indicative of the amplitude difference;
    wherein the differential sample values for the plurality of sample pairs define a plurality of random numbers.

11. The apparatus of claim 10, wherein the amplifier is configured to add quantum noise from at least the photosensor to the shot noise.

12. The apparatus of claim 10, further comprising an optical shield over the LED and the photosensor.

13. The apparatus of claim 10, further comprising a Faraday cage over the LED and the photosensor.

14. The apparatus of claim 10, further comprising a Faraday cage over the LED, photosensor, amplifier, and sampling circuitry.

15. The apparatus of claim 10, further comprising an attenuator disposed between the LED and the photosensor.

16. The apparatus of claim 10, further comprising a second gain stage between an output of the amplifier and an input of the sampling circuitry.

17. The apparatus of claim 10, wherein:
    an intra-sample interval is defined between the two consecutive time points of each sample pair; and
    the intra-sample intervals for the plurality of sample pairs are fixed intervals.

18. The apparatus of claim 10, wherein:
    an intra-sample interval is defined between the two consecutive time points of each sample pair; and
    the intra-sample intervals for the plurality of sample pairs are variable intervals.

19. The apparatus of claim 10, wherein:
    an inter-sample interval is defined between adjacent sample pairs; and the inter-sample intervals for the plurality of sample pairs are variable intervals.

20. The apparatus of claim 10, wherein:

an inter-sample interval is defined between adjacent sample pairs; and the inter-sample intervals for the plurality of sample pairs are pseudo-randomized intervals.

\* \* \* \* \*